Feb. 27, 1968   J. L. MARTIN   3,370,386
MANHOLE
Filed Oct. 22, 1965

INVENTOR.
JOSEPH L. MARTIN
BY Watts & Fisher, attorneys

United States Patent Office 3,370,386
Patented Feb. 27, 1968

3,370,386
MANHOLE
Joseph L. Martin, Wadsworth, Ohio, assignor, by mesne assignments, to New England Realty Co., Barberton, Ohio, a corporation of Ohio
Filed Oct. 22, 1965, Ser. No. 500,687
7 Claims. (Cl. 52—19)

ABSTRACT OF THE DISCLOSURE

A prefabricated manhole, for use with underground conduit systems, which is water tight against ground water, which is vented, constructed to be securely anchored in the ground, and which has external fittings for attachment to conduits.

This invention relates to manhole construction and particularly to a prefabricated manhole for use with underground conduit systems, such as prefabricated underground conduit systems.

Manholes are used in underground conduit systems to provide access to the pipes of the system and to house various controls and fixtures associated with the pipes, such as valves, traps, strainers, etc. In conduit systems in which pipes are encased in fluid-tight casings, manholes also provide access to end portions of the casings for inspecting and testing the casings and for draining the casings of any accumulated water. Such water may be present due to a leak in casing itself, which admits water from the surrounding soil, or due to a leak in the pipes surrounded by the casing.

Prefabricated manholes offer many advantages over manholes that must be constructed at the site of installation. For example, they may be maintained on hand, for immediate installation during the assembly of a conduit system. On site installation time is greatly reduced, especially when such manholes include all valves and other fixtures already assembled within the manhole and ready for connection with the external conduits of the system. Internal piping, fittings and valves must be separately installed in field erected manholes. Moreover, the contractor is at the mercy of the weather and the manhole construction is often carried out under adverse conditions, such as a flooded trench, mud, etc. Delays are extremely common when erecting a concrete or brick manhole. This is not the case with prefabricated manholes. In addition, prefabricated manholes are constructed to uniform standards, pre-inspected, and available to a contractor at a known cost. Also, water tight integrity is obtained far more expeditiously and inexpensively than with conventional construction.

In accordance with the present invention, a prefabricated manhole is provided that is strong, durable and watertight. In the preferred embodiment, the manhole is constructed of galvanized steel and is cathodically protected by sacrificial anodes against electrolytic action or corrosion from soil fluids. Connecting pipes, valves, fixtures and casing stubs are provided as part of the manhole, to be connected with sections of the casing and pipes of an underground conduit system. By placing such manholes where valved branches connect to a main, or at other junctures, the entire network of pipes and plumbing fixtures may be quickly and conveniently assembled. The prefabricated manhole can be installed to correct grade before the conduit system itself is installed. The conduit system may then be lined in and laid between the conduit and casing stubs extending from each manhole.

In the manhole of the present invention, connecting pipes extend across the manhole, through openings in the manhole wall. End seals are provided at the openings in the wall to provide a fluid-tight seal between the extending pipes and the side wall. The end seals also seal the ends of the external conduit casings from the interior of the manhole. Preferably, the end seals are provided with capped openings inside the manhole to permit draining the casings. They may also include conduit vents that extend from the casings through the manhole to the atmosphere above ground. Conduit vents act as telltale devices to signal penetration of water into the conduit system or a leak in the fluid pipe.

An integral sump pit is provided in the floor or lower bulkhead of the manhole to collect any water or moisture that might accumulate. A pair of vents are provided, constructed and arranged to promote a natural and effective circulation of air within the manhole, thereby maintaining the temperature and humidity at substantially ambient conditions. One of these vents is located closely adjacent and directly above the sump pit of the manhole to promote evaporation of any condensation or accumulation of water in the pit. In addition, this vent provides a convenient access by which the intake hose of a pump may be lowered from above ground to the sump pit for removing any large quantities of accumulated water.

An opening is provided in the top of the manhole and a hinged or flanged access cover is provided. A sealing gasket is provided between the cover and opening and the cover is fastened tightly in place with T-bolt fasteners. This provides a fluidtight seal, which prevents the entrance of surface water into the manhole. Furthermore, if the vents are temporarily sealed shut, this arrangement facilitates testing not only the manhole, but the entire conduit system, for leaks. This is done by introducing air under pressure into the system. By opening the drain cap to any casing connected with the manhole, the casing as well as the manhole wlil be pressurized and any leaks readily detected by a drop in air pressure.

Another feature of this invention is the provision of an oversized bottom bulkhead or base plate keyed into a concrete base to firmly and securely anchor the manhole in proper position and location. The concrete encased base plate is connected by anchor plates to the internal pipes, and absorbs expansion thrusts of the pipes. In addition, the concrete base prevents flotation of the manhole in a flooded trench during installation.

Another advantage is increased comfort to maintenance men within the prefabricated steel manhole due to the thin, heat conductive walls. In contrast, concrete manholes are usually built with a minimum of 8-inch thick walls, which act as thermal insulators. As a result, the interior of such manholes are considerably hotter than prefabricated steel manholes.

Other attendant advantages and features of this invention will be readily appreciated as the invention becomes better understood by reference to the following detailed description when considered in connection with the accompanying drawings in which.

Figure 1:
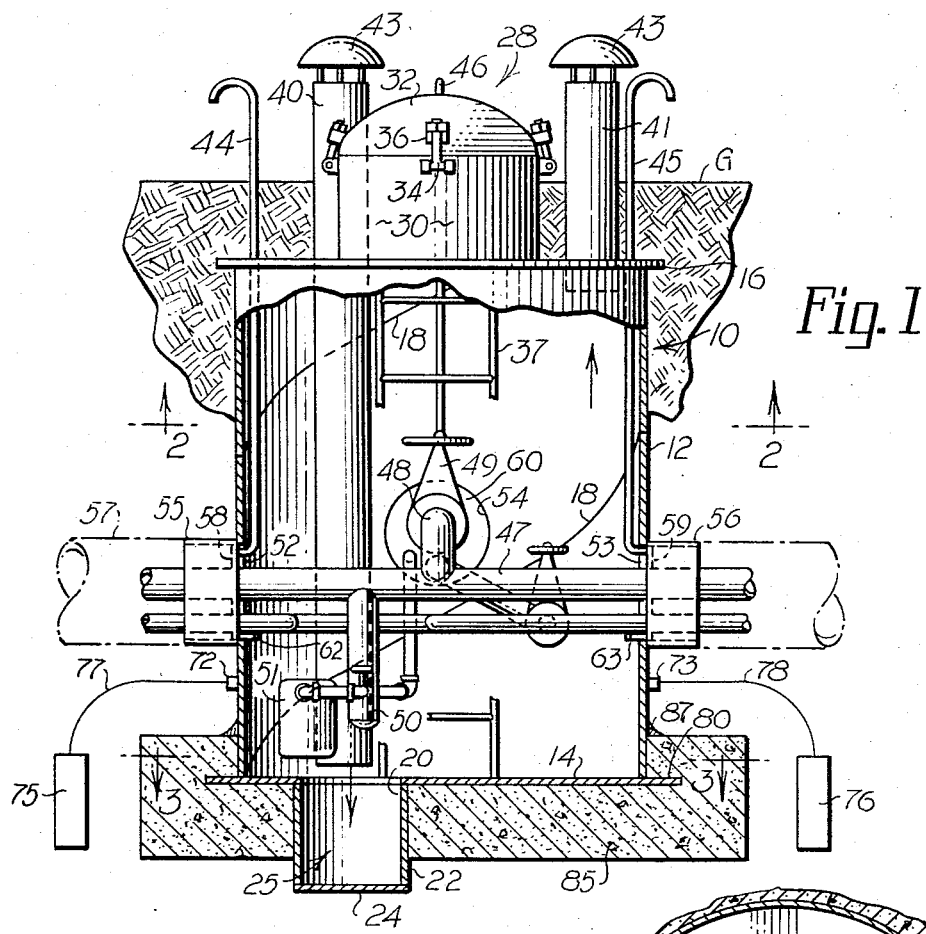
FIGURE 1 is a side elevational view, partly in section, showing a prefabricated manhole constructed and arranged in accordance with the present invention.

Referring now to the drawings, the prefabricated manhole is comprised essentially of a hollow body, indicated generally by the reference numeral 10. In the embodiment shown, the body 10 is cylindrical, and formed of a generally upstanding, circular, side wall 12, a bottom wall or lower bulkhead 14, and a top wall or upper bulkhead 16. The body may alternatively be elliptical, rectangular or of other suitable shape. While the wall 12 is schematically shown as smooth in the drawings, it is preferably constructed of corrugated galvanized steel, and preferably formed of a single sheet, spiralled into a cylindrical wall in the manner indicated by the wall seam 18. The upper and lower bulkheads are preferably galvanized steel plates of circular configuration. These plates are welded to the upper and lower periphery of the circular upstanding wall 12 to form fluidtight connections. The bottom wall 14 extends laterally beyond the side wall 12 to form a flange 19.

A circular opening 20 is provided in the lower bulkhead 14. A cylindrical wall 22 depends from the periphery of the circular opening 20, and is closed at the bottom by a base plate 24 to form a sump pit, indicated generally by reference numeral 25.

Figure 2:
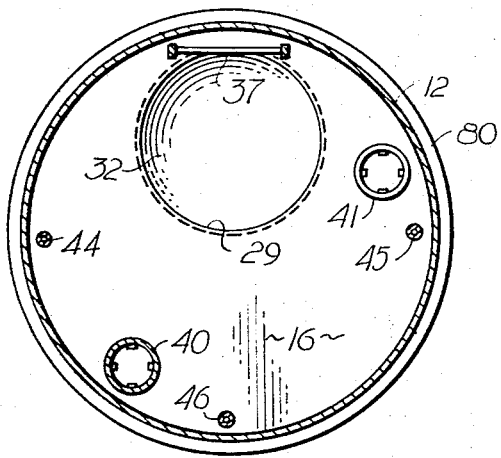
FIGURE 2 is a transverse sectional view taken along the line 2—2 and looking in the direction of the arrows.
Figure 3:
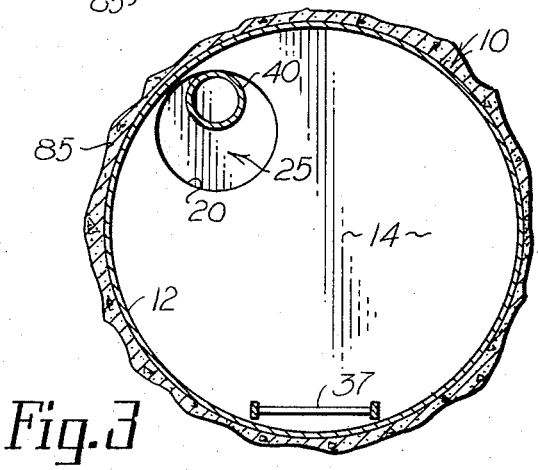
FIGURE 3 is a partial transverse sectional view of the manhole of FIGURE 1, taken along the line 3—3, and looking in the direction of the arrows.

An access 28 is provided at the top of the cylindrical body 10. The access is formed by a circular opening 29 (FIGURE 2) in the top wall 16 and an upstanding cylindrical wall 30, which surrounds the opening and extends above the top wall 16. A hinged access cover 32 is secured at the top of wall 30. An O-ring gasket (not shown) between the upper periphery of the cylindrical wall 30 and the access cover 32 provides a fluidtight seal between the wall 30 and the access cover. T-bolt fasteners 34 attached to the upstanding cylindrical wall 30 cooperates with lugs 36 on the access cover 32 to securely fasten the cover 32 in place. As best shown in FIGURE 2, the access 28 is located adjacent the wall 12. A ladder 37 extends up wall 12 adjacent the access 28 for the convenience of workmen entering and leaving the manhole.

Two venting conduits 40, 41 extend through the top wall 16, vertically above the manhole. A cast iron vent cap 43 is provided at the top of each venting conduit. The upper end of each venting conduit is adapted to be located somewhat above the ground level. The lower end of conduit 40 is located adjacent the bottom wall 14 of the manhole, directly above the sump pit 25. If desired, the bottom of the venting conduit may be cut at an angle to increase the volume of air to be moved. The lower end of the venting conduit 41 is located just beneath the top wall 16 of the manhole. As shown in FIGURE 2, the two venting conduits 40, 41 are located generally diametrically opposite from each other in top wall 16 and adjacent the circular upstanding wall 12.

Conduit vents 44, 45, 46 also extend upwardly through the upper bulkhead 16 and are adapted to extend above ground level. The upper terminal end of each conduit vent is curved so that the vents open downward, preventing the entrance of rain water. Each conduit vent 44, 45, 46 communicates at its lower end with the casing of a conduit of the underground system connected with the manhole.

As shown in FIGURE 1, by way of illustration only, a section of a main pipe 47 extends across the manhole and a branch pipe 48 extends therefrom at right angles. Subsidiary piping and associated fixtures, such as a main steam valve 49, a drip leg 50 and a bucket trap 51, are also located within the manhole and connected with the pipes.

Circular openings 52, 53, 54 extend through the circular upstanding wall 12 to permit the pipes 47, 48 to pass through the manhole. Stub casing, two of which are shown at 45 and 56, surrounds each circular opening 52, 53, 54 and extend outwardly from the upstanding wall 12. Each stub casing is welded to the outer surface of the wall 12 and the extending end is adapted to be welded to a casing wall 57 of a connected conduit, shown in phantom in FIGURE 1.

Metal end-seal plates 58, 59, 60 are located just outside the wall 12, sealed within each stub casing adjacent the circular openings 52, 53, 54. Each end-seal plate surrounds the pipe or pipes passing through the circular openings in wall 12 and is welded to the surrounded pipe or pipes to provide an effective seal, thereby isolating the interior of the manhole from the conduit casings and also from moisture in the environment surrounding the manhole.

Capped conduit drains shown at 62, 63 at the bottom of each end-seal plate communicate through the plate between the interior of the manhole and the conduit casings to permit the casings to be drained. Conduit vents 44, 45, 46 communicate through circular openings 52, 53, 54 and through the upper portion of a respective end-seal plate 58, 59, 60, to vent each casing connected to the man hole to the atmosphere above ground.

Two anode lugs 72, 73 extend from the circular upstanding wall 12 at diametrically opposite locations. Sacrificial anodes 75, 76 are connected electrically to the anode lugs by pigtails 77, 78, respectively. The anodes are constructed of a metal more active (i.e., higher in the electromotive force series of the elements) than the steel of the manhole. For example, magnesium electrodes, being anodic to the steel of the manhole, may be used to afford suitable protection of the metal parts against corrosion by galvanic action. Preferably, the surfaces of the manhole, particularly the outer surfaces, are coated with a material to inhibit corrosion. Nevertheless, damage to such coating, such as scratches or abrasions, permits the metal structure to be subjected to corrosion from moisture in the ground. The sacrificial aluminum electrodes 75 will inhibit such corrosion.

As shown in FIGURE 1, a concrete base block 85 is cast to surround the lower portion of the upstanding wall 12 and to surround the bottom wall 14 and the sump 25. The flange 19 of the bottom wall is thereby encased within the concrete block to firmly anchor the block and manhole together. A waterproof membrane 87 seals the juncture between the upstanding circular wall 12 and the concrete base block 85 to prevent moisture from penetrating between the block and wall.

As will be apparent from FIGURE 1, the cylindrical body 10 and the concrete base block 85 are located completely beneath the surface of the ground, which is indicated by reference character G. In the normal installation, the cylindrical body 10 will be oriented with its axis vertical and with the upper portion of the access 28, including the cover 32, above the surface of the ground. Venting conduits 40, 41 and conduit vents 44, 45, 46 also extend through the top wall 16 of the cylindrical body 10, through the ground, and open above the surface G, where they communicate with ambient atmosphere. Sacrificial anodes 75, 76 are located at any point beneath the surface of the ground, adjacent the cylindrical body 10.

With the manhole construction and arrangement as above described, any water collecting in the manhole from leaks or condensation flows to the sump pit 25. This keeps the bottom wall relatively dry. Where a large quantity of water is collected in the sump pit, for example, from a leak in a pipe or if water is drained from a conduit casing through the conduit drains 62, 63, and into the manhole, the water may be conveniently removed by lowering a pump hose through the vent conduit 40 and into the sump pit. In the normal situation, where relatively small quantities of water and moisture are involved, for example, due to normal condensation, the circulation of air by normal convection through venting conduits 40, 41 evaporates and removes the moisture. That is, as the warmer air in the manhole escapes through the venting conduit 41 at the top wall 16, incoming air is introduced through conduit 40 adjacent the bottom wall 14, directly over the sump pit 25. This evaporates any collected water and carries it out through vent 41.

While in the foregoing disclosure a preferred embodiment of the invention has been disclosed, numerous modifications or alterations may be made therein without departing from the spirit or scope of the invention, as set forth in the appended claims.

What is claimed is:

1. A prefabricated manhole adapted to be buried underground between and connecting separate sections of an underground conduit system, which comprises an upstanding side wall, a bottom wall and a top wall forming an enclosure; an opening in the top wall for access into the enclosure; vents opening through the top wall; a plurality of peripherally spaced openings in the side wall; a length of pipe and associated fixtures within the manhole, said length of pipe extending through the manhole and out said peripherally spaced openings in the side wall; conduit stubs surrounding said openings in the side wall and extending outwardly therefrom; and a sealing plate surrounding said length of pipe at each opening in the side wall to provide a fluidtight seal between the side wall and the length of pipe; said length of pipe and conduit stubs being adapted to be attached to pipes and surrounding conduits of an underground conduit systems, whereby separate sections of a conduit system are joined and anchored in position by the manhole.

2. A prefrabricated manhole adapted to be buried in the ground and connected with a conduit system, which comprises top, bottom and side wall portions sealed with respect to each other and forming an enclosure, a plurality of vents extending upward therefrom, an access to the enclosure through one of said wall portions, a cover over said access constructed and arranged to provide a fluidtight seal therewith, an opening through the side wall portion, a pipe section extending through the opening, a seal plate secured across the opening, said seal plate having an aperture for the pipe section and at least in part supporting the pipe section in the manhole, and a casing stub sealed to the manhole about the seal plate and extending outwardly from the manhole, constructed to be joined to a casing of a conduit system.

3. A manhole adapted to be buried in the ground and connected with a conduit system, which comprises metal top, bottom and side wall portions sealed with respect to each other and forming an enclosure, a plurality of vents extending upward therefrom, an access to the enclosure through one of said wall portions, a cover over said access constructed and arranged to provide a fluidtight seal therewith, an opening through the side wall portion for accommodating the passage of a pipe through the wall, said bottom wall being flat and extending laterally beyond the side wall portions about the periphery of the enclosure to form an anchoring flange, and a concrete base block about the bottom of the enclosure, encasing the anchoring flange and extending laterally from the side wall portions to anchor the manhole in the ground.

4. A manhole adapted to be buried in the ground and connected with a conduit system, which comprises top, bottom and side wall portions sealed with respect to each other and forming an enclosure, a plurality of vents extending upward therefrom, an access to the enclosure through one of said wall portions, a cover over said access constructed and arranged to provide a fluidtight seal therewith, an opening through the side wall for accommodating the passage of a pipe through the wall, a seal across the opening in the side wall portion and adapted to provide a seal between the wall and a pipe passing through said opening, and a casing stub extending outwardly from the side wall portion about the said opening through the wall and adapted to be joined to a casing of a conduit system, said plurality of vents including a conduit vent extending through the top wall and upward therefrom and communicating from within the enclosure to outside the enclosure within the casing stub.

5. A manhole which comprises a side wall and sealed end walls forming an enclosure, an opening through one of the end walls, a cover for the opening that closes the opening and provides a fluidtight seal, an opening in the side wall, a length of pipes extending through the opening, a casing stub extending outwardly of the side wall from the opening in the side wall, a fluidtight seal between the pipe and the side wall, which also seals closed the end of the casing stub where it joins the side wall, a conduit vent opening through the enclosure to the outside thereof within the casing stub and extending through the enclosure to the outside thereby providing a pasageway to above the enclosure for a conduit casing attached to the stub without opening into the enclosure, and a plurality of venting conduits communicating between the interior of the enclosure and the exterior, said venting conduits being the only unsealed openings between the inside of the enclosures when the said cover is closed, whereby a manhole is provided that is effectively sealed from ground moisture and which may, by itself and in conjunction with an entire conduit system, be air tested for tightness by closing off the venting conduits and pressurizing the enclosure.

6. A manhole which comprises a side wall and sealed end walls forming an enclosure, an opening through one of the end walls, a cover for the opening that closes the opening and provides a fluidtight seal, at least two openings in the side wall, a length of pipe extending through said openings and between said openings within the enclosure, sealing means providing a fluidtight seal between the pipe and the side wall, a plurality of venting conduits communicating between the interior of the enclosure and the exterior, said venting conduits being the only unsealed openings between the inside and outside of the enclosure when the said cover is closed, and a capped drain opening communicating through the side wall and adapted to open into a casing surrounding a pipe of a conduit system connected to the manhole so that the conduit system can be air tested with the manhole through the drain opening, whereby a manhole is provided that is effectively sealed from ground moisture and which may, by itself and in conjunction with an entire conduit system, be air tested for tightness by closing off the venting conduits and pressurizing the enclosure.

7. A prefabricated manhole adapted to be buried in the ground and connected with a conduit system, which comprises top, bottom and side wall portions sealed with respect to each other and forming an enclosure, an access to the enclosure through the top wall portion, a cover said access, an opening through the side wall portion for accommodating the passage of a pipe through the wall, a seal across the opening in the side wall portion and adapted to provide a seal between the wall and a pipe passing through said opening, a sump pit formed in the bottom wall directly communicating with the interior of the enclosure, and a plurality of vents extending upward from the enclosure, including two conduits extending through the top wall, one conduit terminating adjacent the top wall within the enclosure and the other conduit terminating adjacent to but spaced above the bottom wall within the enclosure, directly above the sump pit.

References Cited

UNITED STATES PATENTS

| | | | |
|---|---|---|---|
| 1,350,306 | 8/1920 | Forshee et al. | 52—20 |
| 2,810,690 | 10/1957 | Campise et al. | 204—197 |
| 3,097,166 | 7/1963 | Monson | 52—169 |
| 3,177,284 | 4/1965 | Stussel | 52—221 |
| 3,196,813 | 7/1965 | McHugh | 52—169 |
| 3,237,538 | 3/1966 | McPheeters et al. | 94—34 |
| 3,263,378 | 8/1966 | Dorris | 52—169 |

FOREIGN PATENTS

| | | |
|---|---|---|
| 507,111 | 6/1939 | Great Britain. |
| 525,438 | 5/1955 | Italy. |

REINALDO P. MACHADO, *Primary Examiner.*

UNITED STATES PATENT OFFICE
CERTIFICATE OF CORRECTION

Patent No. 3,370,386                  February 27, 1968

Joseph L. Martin

It is hereby certified that error appears in the above numbered patent requiring correction and that the said Letters Patent should read as corrected below.

Column 6, line 9, before "stub" insert -- casing --; line 13, after "inside" insert -- and outside --; line 44, after "cover" insert -- over --.

Signed and sealed this 20th day of May 1969.

(SEAL)
Attest:

Edward M. Fletcher, Jr.
Attesting Officer

Commissioner of Patents